United States Patent Office 3,228,419
Patented Jan. 11, 1966

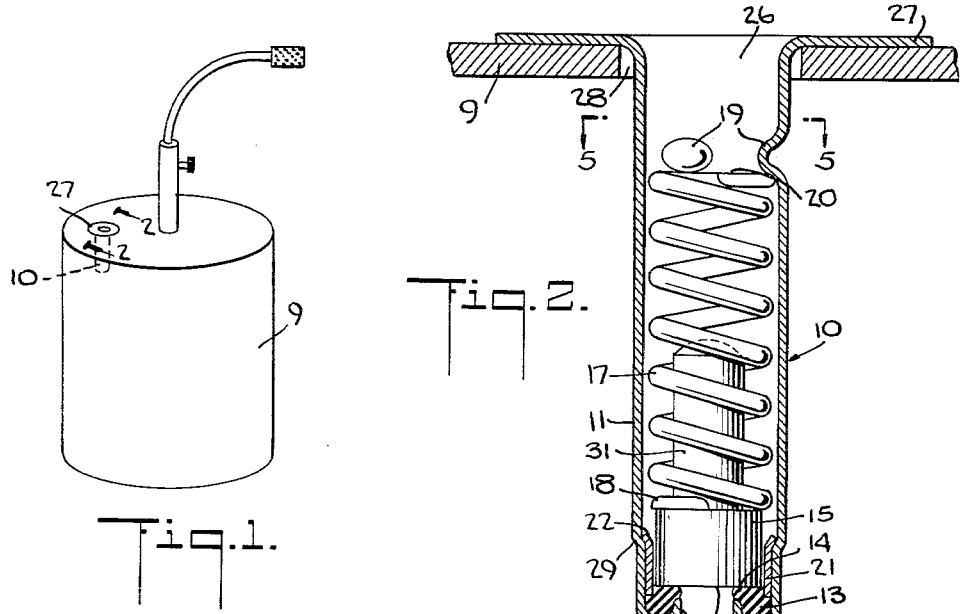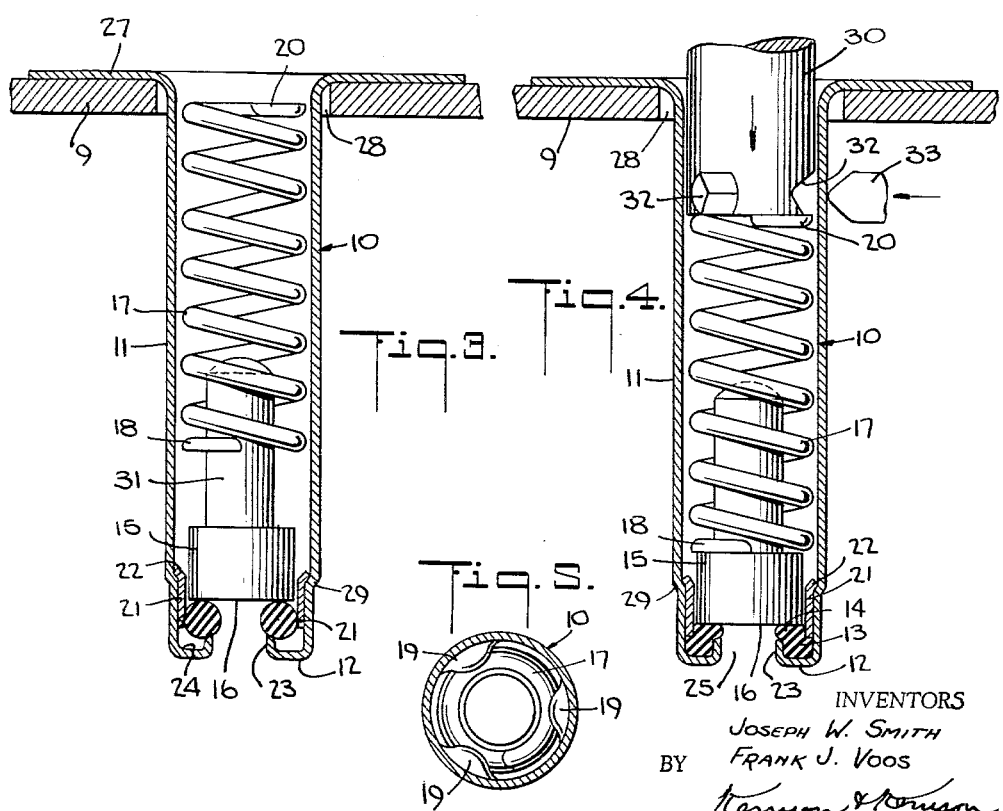

3,228,419
RELIEF VALVE
Joseph W. Smith, 4 Pert St., Trumbull, Conn., and Frank J. Voos, 71 Green Valley Road, Stratford, Conn.
Filed Sept. 1, 1961, Ser. No. 135,563
4 Claims. (Cl. 137—540)

This invention relates to gas relief valves and more particularly relates to such a valve having high reliability and accuracy characteristics.

Gas relief valves are employed in many situations where it is advantageous to vent a gas pressure source at a predetermined pressure. A common expedient has been to load the valve with a known spring force duplicating said predetermined pressure. However, it has been a fault of prior valves that such spring loading has either been inaccurate or uneconomical depending upon which design criterion was paramount in a given application. With prior techniques it has been extremely difficult to hold the tolerance on the predetermined venting pressure to less than plus or minus 20%, and to do so has moreover been uneconomical. Another fault of prior valves has been a tendency to open and close erratically at their individual opening and closing pressure. In other words, their seating characteristics have militated against reliability.

It is therefore a primary object of the present invention to provide a gas relief valve having high venting accuracy so as to vent within a relatively close tolerance of the predetermined venting pressure.

Another object of the invention is to provide such a relief valve that has high reliability in seating and unseating so as to afford smooth venting and capping of the valved gas.

Another object of the invention is to provide such a valve having the aforesaid high venting accuracy combined with high manufacturing economy.

These and further objects and advantages of the invention will become apparent to those skilled in the art upon inspection of the following detailed description of one illustrative embodiment of the invention when taken with the appended drawing wherein like characters identify like parts in all views thereof, and wherein:

FIGURE 1 is a perspective view of a relief valve according to the present invention mounted in a gas pressure vessel;

FIGURE 2 is a section view of the mounted valve of FIGURE 1 taken along lines 2—2 therein and showing internal details of construction.

FIGURE 3 is a section view similar to that of FIGURE 2 and showing the parts thereof in a preliminary stage of assembly;

FIGURE 4 is a section view similar to that of FIGURE 3 showing the arrangement of parts subsequent to that view wherein the spring is compressed and support therefor is supplied so that the assembly of FIGURE 2 is produced; and FIGURE 5 is a section view taken along line 5—5 in FIGURE 2 showing details of the spring support.

Briefly, the relief valve 10 according to the present invention as shown fully assembled in FIGURE 2 comprises a tubular stem 11 having a valve seat retainer 12 in one end thereof, an O-ring 13 carried within said stem by said retainer with a portion 14 thereof facing axially inward of said retainer, a cylindrical valve plunger 15 slidably engaged therein in axial close fitting relation and having a gas pressure sensing face 16 disposed in annular seating engagement with said inwardly facing O-ring portion, a compression loaded helical spring 17 disposed axially within said stem with a first end 18 thereof urging said slidable valve plunger against said O-ring, a support 19 within said stem axially restraining the second end 20 of said spring, said support being situated an axial distance from said inwardly facing O-ring portion 14 surface sufficient to maintain a force on said valve plunger 15 equal to the force exerted upon said valve sensing face 16 by the predetermined pressure in the gas vessel.

More particularly, the relief valve 10 is preferably mounted in a gas vessel such as torch 9 with pressure sensing face 16 facing inwardly of said vessel. Stem 11 is preferably fabricated in a metal, and O-ring 13 may be fabricated in any suitable sealing material known to those skilled in the art to withstand the service desired in a particular application.

A ferrule 21 may be disposed in close fitting annular engagement with the inner wall of said stem 11 adjacent said retainer 12 and in contact with said O-ring 13. The ferrule 21 has an outwardly flared upper rim 22 adapted to guide valve plunger 15 in and out of close axial registration with said ferrule. It is preferably fabricated in metal such as brass, although other materials may be used. The ferrule is principally responsible for increasing the reliability of even seating and unseating of valve plunger 15.

Retainer 12 comprises an inwardly turned portion 23 defining an annular trough 24 having the female side thereof facing axially inward of the retainer end of the stem. Inwardly turned portion 23 defines and surrounds a gas pressure source aperture 25 in the aforesaid retainer end of the stem which aperture communicates with pressure sensing surface 16. A venting aperture 26 appears in the opposed end of said stem, that is the end opposite the retainer end. This aperture admits the interior of the stem to the outer atmosphere (or other lower pressure area) as shown in FIGURE 1. For the purpose of mounting the valve 10 on a vessel such as 9, an outwardly disposed mounting flange 27 surrounding the venting aperture 26 is provided. Smaller configurations may be employed where space is important. For instance a short crimp may be made (not shown) in the wall of stem 11 which will act as a mounting shoulder in place of flange 27.

In the figures flange 27 is shown sealably fixed to the outer or lower pressure side of the vessel 9. It may alternately be affixed to the inner surface, the choice being dependent upon convenience in assembling the vessel 9. Welding or similar expedients may be employed. Although FIGURES 3 and 4 show flanges 27 affixed to vessel 9 during the preliminary stages of the assembly of valve 10, this need not be so. The valve may also advantageously be assembled before flanges 27 are affixed to vessel 9. Vessel or reservoir 9 has a valve mounting aperture 28 therein smaller in diameter than flanges 27 and adapted to receive valve 10.

Support 19 comprises at least one, and preferably a plurality of indentations along the flange end of stem 11 which intercept the end 20 of spring 17. As will be hereinafter explained, support 19 is created after spring 17 has been compressed and calibrated to the aforesaid predetermined venting pressure. The support is situated an axial distance from the inwardly facing O-ring portion 14 surface sufficient to maintain a force on the valve plunger 15 equal to the force exerted upon the valve plunger sensing face 16 by the predetermined venting pressure with the vessel 9. The support indentations 19 are shown in FIGURE 5 as three in number and equally spaced circumferentially.

When assembled and sealed into a vessel 9 or the like, relief valve 10 has a spring load pressure upon O-ring portion 14 that approximates the predetermined venting pressure to a higher degree than has heretofore been possible, and does so despite an unusually economical method of assembly and calibration. The configuration of the O-ring 13 when received into trough 24 and contacted by ferrule 21 and valve plunger 15 affords excellent venting and closing characteristics so that the valve's excellent accuracy is highly reliable and repetitive from valving occurrence to valving occurrence.

Their relief valve 10 is assembled and calibrated in one integrated series of steps which are responsible for the combination of economy and valving characteristics heretofore impossible to attain by the prior art techniques. An O-ring 13 is dropped into trough 24 but does not bottom herein because of the greater diameter of the O-ring. A ferrule 21 is then driven down into the bore of stem 11 which has an annular shoulder 29 at the retainer end thereof so as to define a smaller diameter therebelow. The ferrule 21 preferably has a diameter appropriate to be force fitted into the stem portion below shoulder 29. The forced insertion may be accomplished by a cylindrical spring depressor 30 or similar means. Spring depressor 30 serves a second function as explained hereinbelow. Once inserted, ferrule 21 will bottom its rim 22 on shoulder 29, and may remain force fitted or may be welded from the outside by known techniques. Welding may also be employed without a preliminary force fit.

Valve plunger 15 is then dropped into stem 11 and by virtue of rim 22 is guided into the aforesaid close fitting axial registration shown in FIG. 3. Spring 17, uncompressed, is then dropped into stem 11 and guided to plunger 15 by tail 31. Depressor 30 is then administered to end 20 of spring 17 as shown in FIGURE 4. Depressor 30 has an appropriate number of indentations 32 therein spaced circumferentially about the lower end thereof for a purpose described below. A load is placed upon depressor 30 either by weight or other known means. The load should be chosen to equal the predetermined venting pressure for the particular valve in question multiplied by the known area of face 16 exposed through aperture 25. Spring 17 will depress toward the retainer end because of this load. An appropriate number of pointed members 33 are then impressed radially into the side of stem 11 so that each member 33 impresses the stem wall thereunder toward an underlying indentation 32. When sufficient lateral force has been applied to these members 33, they will have forced the underlying wall of stem 11 into each of indentations 32 in depressor 30 thus forming the support indentations 19 in stem 11 and thereby capturing spring 17 at a point where the proper compression has been attained therein.

It is preferred that depressor 30 have members 33 correlated thereto mechanically so that whatever depth depressor 30 descends to the members 33 will be appropriately arranged axially and radially. It should be noted that indentations 32 in depressor 30 have a shallow lower edge. The reason for this is that depressor 30 must be withdrawn after indentations 19 have been formed in stem 11. The shallow lower edge of indentations 32 allows them to slide over stem indentations 19 upon withdrawal, because stem 11 will springably bulge outwardly slightly when depressor 30 is forcibly withdrawn. Indentations 19 will be work hardened and will not be deformed by this withdrawal, and stem 11 will not be permanently stressed by the very slight bulge outward and so will springably return thereafter. What remains will be what is shown in FIG. 2.

The process is very simple and economical in use, and produces a very high accuracy and high reliability relief valve with a minimum of equipment and expense. As already explained, the valve when mounted will vent very close to the predetermined pressure and will reliably vent very close to the same pressure every time. In these two characteristics the instant valve is superior to the prior art and at the same time more economical to produce.

Those skilled in the art will find this specification a complete illustration of what is at present believed to be the best means for practicing the invention. However, it will be apparent that certain modifications may be made in the arrangement of the parts without departing from the scope of the invention which has been merely illustrated, not limited, by the embodiment shown herein.

What is claimed is:

1. A relief valve comprising an elongated thin-walled tubular stem including a main section and a high pressure end section of reduced radius integral therewith, an angular peripheral shoulder at the junction of the two sections, an annular trough member on said end section having an axially inwardly turned lip thereon, a sleeve having an outwardly flared lip at one end thereof disposed in said end section in close fitting relationship therewith, with its said flared lip engaging said shoulder and its other end extending into said end section to a point adjacent the inner end of the lip on said trough member, a cylindrical valve plunger slideable axially in said sleeve and having a face disposed toward said trough member, an O ring filling said trough member and having a portion extending beyond said lip thereon, said sleeve engaging said O ring and holding it in said trough helical spring means in said stem for urging said plunger in sealing engagement at a predetermined pressure with said O ring, an indentation formed integrally within said stem for capturing said spring means within said stem, said plunger having an outside diameter greater than the mean diameter of said O ring and being constructed and arranged so that said O ring is compressed by said face of said plunger to provide a sealing surface including an inwardly extending portion thereof engaged between said face and said lip on said trough.

2. A relief valve comprising an elongated thin-walled tubular stem including a main section and a high pressure end section of reduced radius integral therewith, an angular peripheral shoulder at the junction of the two sections, an annular trough member on said end section having an axially inwardly turned lip thereon, a sleeve having an outwardly flared lip at one end thereof disposed in said end section in close fitting relationship therewith, with its said flared lip engaging said shoulder and its other end extending into said end section to a point adjacent the inner end of the lip on said trough member, a cylindrical valve plunger slideable axially in said sleeve and having a face disposed toward said trough member, an O ring filling said trough member and having a portion extending beyond said lip thereon, said sleeve engaging said O ring and holding it in said trough, said plunger including an axial extension disposed inwardly from said end section, helical spring means in said stem engaging said extension for urging said plunger in sealing engagement at a predetermined pressure with said O ring, an indentation formed integrally within said stem for capturing said spring means within said stem, said plunger having an outside diameter greater than the mean diameter of said O ring and being constructed and arranged so that said O ring is compressed by said face of said plunger to provide a sealing surface including an inwardly extending portion thereof engaged between said face and said lip on said trough.

3. A relief valve comprising an elongated thin-walled tubular stem including a main section and a high pressure end section of reduced radius integral therewith, an angular peripheral shoulder at the junction of the two sections, an annular trough member on said end section having an axially inwardly turned lip thereon, a sleeve having an outwardly flared lip at one end thereof disposed in said end section in close fitting relationship therewith, with its said flared lip engaging said shoulder and its other end extending into said end section to a point adjacent the inner end of the lip on said trough member, a cylindrical valve plunger slideable axially in said sleeve and having a flat face disposed toward said trough member, an O ring filling said trough member and having a portion extending beyond said lip thereon, said sleeve engaging said O ring and holding it in said trough, said plunger including an axial extension disposed inwardly from said end section, helical spring means in said stem engaging said extension for urging said plunger in sealing engagement at a predetermined pressure with said O ring, an indentation formed integrally within said stem for capturing said spring means within said stem, said plunger having an outside diameter greater than the mean diameter of said O ring and being constructed and arranged so that said O ring is compressed by said flat face of said plunger to provide a sealing surface including an inwardly extending portion thereof engaged between said face and said lip on said trough.

4. A relief valve comprising an elongated thin-walled tubular stem including a main section and a high pressure end section of reduced radius integral therewith, an angular peripheral shoulder at the junction of the two sections, an annular trough member at the outer extremity of said end section having an axially inwardly turned lip thereon, a sleeve having an outwardly flared lip at one end thereof disposed in said end section in close fitting relationship therewith, with its said flared lip engaging said shoulder and its other end extending into said end section to a point adjacent the inner end of the lip on said trough member, a cylindrical valve plunger slideable axially in said sleeve and having a flat face disposed toward said trough member, an O ring filling said trough member and having a portion extending beyond said lip thereon, said sleeve engaging said O ring and holding it in said trough, said plunger including an axial extension disposed inwardly from said end section, helical spring means in said stem engaging said extension for urging said plunger in sealing engagement at a predetermined pressure with said O ring, an indentation formed integrally within said stem for capturing said spring means within said stem, said plunger having an outside diameter greater than the mean diameter of said O ring and being constructed and arranged so that said O ring is compressed by said flat face of said plunger to provide a sealing surface including an inwardly extending portion thereof engaged between said face and said lip on said trough.

References Cited by the Examiner
UNITED STATES PATENTS

| | | | |
|---|---|---|---|
| 1,322,638 | 11/1919 | Smolensky | 137—540 |
| 1,454,409 | 5/1923 | Richter | 137—538 XR |
| 2,322,139 | 6/1943 | Kaelin | 137—539.5 XR |
| 2,325,685 | 8/1943 | Keefe | 137—223 |
| 2,451,586 | 10/1948 | Strid | 137—539 XR |
| 2,666,448 | 1/1954 | Garretson | 137—540 |
| 2,745,432 | 5/1956 | Williams | 251—333 XR |
| 2,781,778 | 2/1957 | Lisciani | 137—540 |
| 2,885,176 | 5/1959 | Bryant | 251—332 XR |
| 2,896,663 | 7/1959 | Mena | 137—539 |
| 2,970,467 | 2/1961 | Pettibone | 73—4 |
| 2,971,090 | 2/1961 | Piet et al. | 251—357 XR |
| 2,973,870 | 3/1961 | Schoos | 267—1 XR |
| 3,003,423 | 10/1961 | Drutchas | 137—539.5 XR |

MARTIN P. SCHWADRON, *Acting Primary Examiner.*
ISADOR WEIL, WILLIAM F. O'DEA, *Examiners.*